Dec. 13, 1938.  H. W. BOGART  2,139,666
STABILIZER FOR AUTOMOBILE STEERING GEARS
Filed Oct. 10, 1936
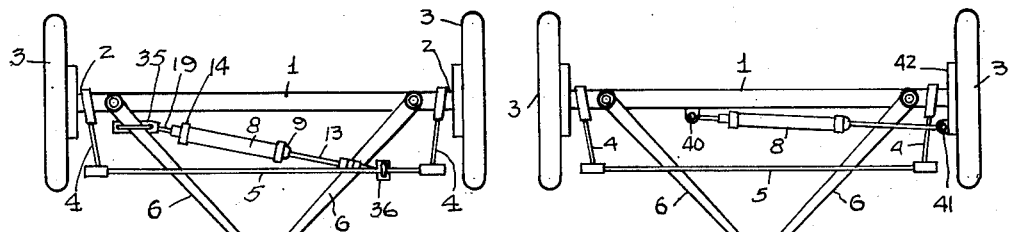
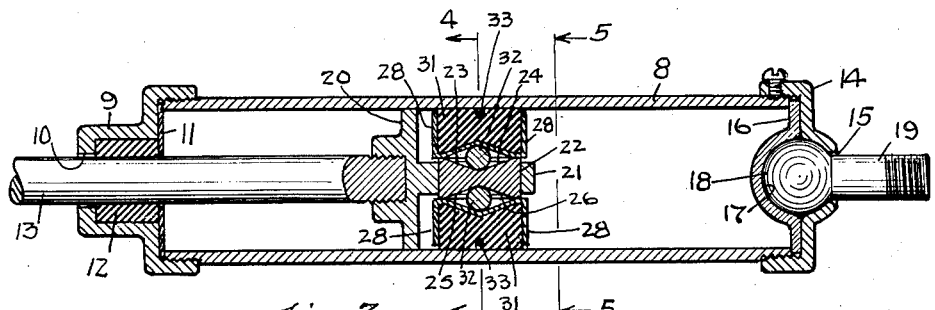
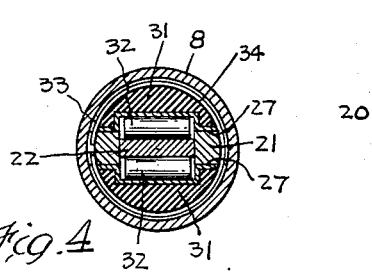
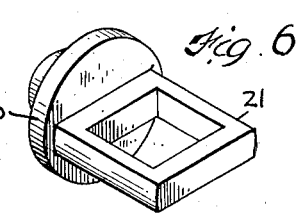
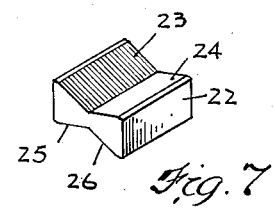
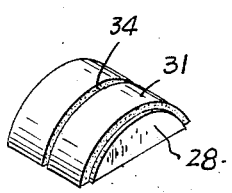
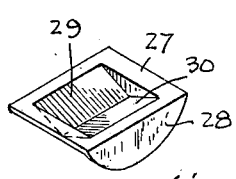
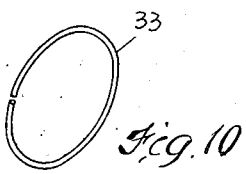
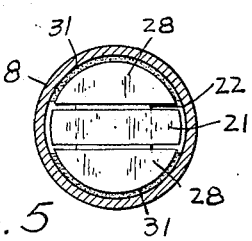
INVENTOR.
Henry W. Bogart
BY Fay, Oberlin & Fay
ATTORNEYS.

Patented Dec. 13, 1938

2,139,666

UNITED STATES PATENT OFFICE 2,139,666

STABILIZER FOR AUTOMOBILE STEERING GEARS

Henry W. Bogart, Lakewood, Ohio

Application October 10, 1936, Serial No. 105,057

11 Claims. (Cl. 280—89)

This invention relates, as indicated, to a safety steering gear stabilizer, but has reference more particularly to a device of this character which is adapted for use in connection with the front or steering wheels of a motor vehicle.

The primary object of the invention is to provide a device of the character described which, in the event of a tire blow-out, will automatically brake and control the front wheels so as to keep the vehicle on its course and prevent swerving of the vehicle towards the sides of the road, but which does not at other times interfere in any way with the normal steering of the car.

Other objects of the invention are to provide a device of the character described which relieves the strain of driving by absorbing and controlling road shocks occasioned by striking obstructions and holes in the road and rough pavements; which will prevent shimmying and wabbling of the front wheels of the vehicle, thereby preventing unnecessary wear of the front tires and associated parts; which consists of a minimum number of inexpensive-to-manufacture parts; which can be easily and quickly installed either as standard or as new equipment on a motor vehicle; and which after installation requires virtually no attention.

To the accomplishment of the foregoing and related ends, said invention, then, consists of the means hereinafter fully described and particularly pointed out in the claims; the annexed drawing and the following description setting forth in detail certain structure embodying the invention, such disclosed structure constituting, however, but one of various structural forms in which the principle of the invention may be used.

In said annexed drawing:—

Fig. 1 is a top plan view of the steering gear of a Ford V-8 automobile showing the manner in which the stabilizer may be attached thereto;

Fig. 2 is a similar view showing an alternative method of attachment;

Fig. 3 is a longitudinal cross-sectional view of the stabilizer;

Fig. 4 is a transverse cross-sectional view of the stabilizer, taken on the line 4—4 of Fig. 3;

Fig. 5 is a transverse cross-sectional view of the stabilizer, taken on the line 5—5 of Fig. 3;

Fig. 6 is a perspective view of the guide washer and yoke;

Fig. 7 is a perspective view of the brake-shoe wedge block;

Fig. 8 is a perspective view of one of the brake shoes;

Fig. 9 is a perspective view of one of the brake shoe holders; and

Fig. 10 is a perspective view of the snap ring used for maintaining the brake shoes in assembled relation.

Although the stabilizer is illustrated as used in connection with the steering gear of a Ford V-8 automobile, it will be understood that it is suitable for use on all types of automobiles, trucks, busses and similar vehicles.

Referring more particularly to Figs. 1 and 5 to 10 inclusive, it will be seen that the vehicle includes a front axle 1, to the ends of which are pivoted stub axles or steering knuckles 2, on which the wheels 3 are mounted. The knuckles 2 have rearwardly extending arms 4 which are united by a connecting or tie-rod 5. The axle 1 is braced by the usual radius rods 6 which are connected as at 7 to the frame or chassis of the motor vehicle. Steering of the front wheels is effected in the usual manner by movement of the tie-rod 5 to the right or left in response to rotation of the steering wheel of the motor vehicle.

The stabilizer comprises a tubular casing or housing 8, one end of which is threaded to receive a cap 9 having a central opening 10. A washer 11 is interposed between the cap and the end of casing 8, and a packing 12 is interposed between the cap and the washer. This packing surrounds the rod 13 which forms a part of the stabilizer and extends through an opening 10 and into the casing 8, the packing serving to preclude the entrance of dust and dirt into the casing.

The opposite end of the casing 8 is threaded to receive a cap 14 having a central opening 15. A washer 16, having a central hemispherical recess 17, is interposed between the cap 14 and end of casing 8, and a ball 18 is interposed between cap 14 and washer 16, this ball being provided with a stud 19 extending through the opening 15 in the cap 14. This connection between the casing and stud 19 permits slight changes in the angle between the casing 8 and tie-rod 5 during normal steering.

Disposed for longitudinal sliding movement within the casing 8 is a guide washer 20 one side of which is threadedly secured to the end of rod 13 which is disposed within the casing. Formed integrally with and extending from the other side of washer 20 is a closed rectangular yoke 21. The guide washer and yoke are preferably made of bronze of high tensile strength. The yoke 21 encloses and embraces a wedge block 22, which is preferably made of steel and consists in effect of a pair of wedges joined at their narrower edges, having inclined surfaces 23, 24 at one side thereof and oppositely inclined surfaces 25, 26 at the other side thereof.

Disposed adjacent each side of the wedge block 22 is a brake shoe holder, preferably made in the form of a stamping, having a generally rectangular body 27 and end flanges 28, the latter being in the form of segments of a circle which is of slightly smaller diameter than the internal diameter of the casing 8. The metal of the body 27 is pressed inwardly to provide a pair of inclined surfaces 29 and 30. The surface 29 of one of the holders is parallel with the surface 24 of the wedge block and the surface 30 of such holder is parallel with surface 23 of said block. Similarly, the surface 29 of the other holder is parallel with the surface 26 of the wedge block and the surface 30 is parallel with the surface 25 of said block. Each of the holders has mounted therein a brake shoe 31 of any suitable braking material which is in the form of a segment of a cylinder of substantially the same diameter as the internal diameter of the casing 8.

A roller 32 is disposed between each side of the wedge block 22 and the brake shoe holder adjacent thereto. These rollers extend transversely of the casing 8, and their axes normally lie in a transverse plane defined by the intersections of surfaces 23 and 24, 25 and 26, and 29 and 30.

The rod 13, washer and yoke 20, 21, wedge block 22, brake shoe holders 27, brake shoes 31 and rollers 32 are assembled prior to insertion into the casing 8, and in order to maintain them in assembled relation prior to insertion in the casing, as well as to permit their removal as a unit from the casing, a snap ring 33 is provided, which is disposed in grooves 34 in the peripheral surface of the brake shoes 31.

In installing the stabilizer on the motor vehicle, the stud 19 is secured to a clamp 35, which in turn is rigidly secured to one of the radius rods 6, preferably at a point adjacent the forward end thereof. The rod 13 is pivotally secured, as by a clamp 36 to the tie-rod 5, preferably at a point adjacent the end of such rod, as clearly shown in Fig. 1. The point of attachment of the clamp 36, as will be noted, is at the side of the car opposite that at which the clamp 35 is secured.

During the normal steering operations, the rod 13 will be moved by the tie-rod 5 and the guide washer 20 and brake assembly will slide freely along the casing 8. This will occur regardless of the rapidity with which the steering wheel is rotated by the driver during the normal operation of the motor vehicle. The guide washer 20 is particularly effective in insuring such free sliding movement of the brake assembly, as it centralizes the rod 13 and yoke 21 and prevents dragging of said assembly as a result of vibrations imparted thereto.

In the event of a blow-out of one of the tires, however, a sudden longitudinal or axial impact is given to the rod 13, but due to the inertia of the brake shoe holders and brake shoes, these parts will tend to remain stationary with respect to the casing, and the surfaces 23, 25 or 24, 26 of the wedge block will exert a wedging effect, forcing the rollers 32 radially outwardly. As these rollers move outwardly they force the brake shoes 31 outwardly and into tight frictional engagement with the inner wall of the casing, thereby braking the rod 13 against movement, and preventing motion of the tie-rod and wheels of the motor vehicle. Consequently, instead of the car being diverted from its course as a result of the blow-out, it will continue in its true course until the car can be brought under control and the speed thereof slackened. Upon release of the sudden force which created the impact on the rod 13, the normal steering of the front wheel may be resumed. Inasmuch as the brake shoes brake and release instantaneously, there is no resistance to normal steering.

In addition to the wedging effect of the wedge block on the rollers, an equal wedging effect is imparted by the inclined surfaces 29 and 30 of the brake shoe holders. The wedging effect is, as a result of the construction, so great that the movement of the rod 13 at the instant of an impact produced by any cause is scarcely perceptible. Consequently, the wheels of the vehicle will be held virtually instantaneously. Conversely, the construction of the stabilizer is such that the release of the steering mechanism is likewise effected instantaneously, so that virtually no time elapses between the release of the force which caused the impact on the rod 13 and the release of the steering mechanism. The snap ring 33 assists in the return of the brake shoe holders to their normal position, permitting movement of the brake shoes and their holders along the casing so that normal operation of the steering mechanism will not be impeded. In other words, the snap ring virtually holds the brake shoes out of frictional engagement with the inner wall of the casing except at such times when they are moved radially outwardly, as described. Due to the floating character of the wedge block 22, the brake shoes and their holders will be self-centering.

The braking and release of the rod 13 is accomplished so quickly that the stabilizer is effective not only for controlling the steering mechanism following a blow-out, but for relieving the strains of driving by absorbing and controlling road shocks occasioned by striking obstructions and holes in the road and rough pavements, and for preventing shimmying and wabbling of the front wheels of the car, thereby preventing unnecessary wear of the front tires and associated car parts.

It will be understood that the rod 13, instead of being secured to the tie rod, may be secured to any other element actuated by the steering wheel, and that the stud 19, instead of being secured to the radius rod, may be secured directly to the axle 1 or to any stationary element of the running gear.

In incorporating the stabilizer as a part of the standard equipment in a car, the stud 19, as shown in Fig. 2, may be secured to a lug 40 extending from the front axle and the rod 13 may be secured to a lug 41 on the brake drum housing 42, or to the steering arm or any part moving in same plane, thereby obviating the use of more costly ball and socket joints.

Other modes of applying the principle of my invention may be employed instead of the one explained, change being made as regards the structure herein disclosed, provided the means stated by any of the following claims or the equivalent of such stated means be employed.

I therefore particularly point out and distinctly claim as my invention:—

1. In a steering gear stabilizer for automobiles, a casing, a rod reciprocable within said casing, a member disposed within said casing and movable longitudinally of said casing by said rod, a wedge block movable by said member and having wedging surfaces at opposite sides thereof, brake shoe holders disposed adjacent said sides of the wedge block and having wedging surfaces inclined oppositely to those of the wedge block, brake shoes mounted in said holders, and rollers interposed between said wedge block and said brake shoe holders.

2. In a steering gear stabilizer for automobiles, a casing, a rod reciprocable within said casing and a member disposed within said casing and movable longitudinally of said casing by said rod, said member comprising a disk-like element of substantially the same diameter as the internal diameter of said casing, and a yoke extending from one side of said element.

3. In a steering gear stabilizer for automobiles, a casing, a rod reciprocable within said casing and means disposed within said casing and movable longitudinally of said casing by said rod, said means comprising a member rigid with said rod and extending entirely across the interior of said casing, and a yoke extending from one side of said member.

4. In a steering gear stabilizer for automobiles, a casing, a rod reciprocable within said casing and means disposed within said casing and movable longitudinally of said casing by said rod, said means comprising a member rigid with said rod and extending entirely across the interior of said casing, a yoke extending from one side of said member, and a wedging element embraced by said yoke.

5. In a steering gear stabilizer for automobiles, a casing, a rod reciprocable within said casing and means disposed within said casing and movable longitudinally of said casing by said rod, said means comprising a member rigid with said rod and extending entirely across the interior of said casing, brake shoes movable radially towards the wall of said casing and means for effecting said radial movement.

6. In a steering gear stabilizer for automobiles, a casing, and means disposed within said casing and movable longitudinally thereof, said means comprising a member extending entirely across the interior of said casing, braking members movable outwardly towards the inner wall of said casing, and means for effecting said outward movement, said member acting to guide and center said brake members.

7. A stabilizer for the steering mechanism of a vehicle, said stabilizer adapted for connection at one end to a part of the vehicle relatively stationary with respect to the steering mechanism, and at the other end to the steering mechanism or to an element movable in response to movement of the steering wheel of the vehicle, said stabilizer comprising a casing, a rod reciprocable within said casing, braking mechanism movable by said rod along said casing, said braking mechanism comprising braking elements movable outwardly towards the inner wall of said casing in response to sudden impacts on said rod for positively braking said rod against movement, and means effective immediately after such braking action for returning said braking elements to their normal position to permit free movement of the braking mechanism along the casing so that normal operation of the steering mechanism is not impeded.

8. A stabilizer for the steering mechanism of a vehicle, said stabilizer adapted for connection at one end to a part of the vehicle relatively stationary with respect to the steering mechanism, and at the other end to the steering mechanism or to an element movable in response to movement of the steering wheel of the vehicle, said stabilizer comprising a casing, a rod reciprocable within said casing, braking mechanism movable by said rod along said casing, said mechanism comprising braking elements movable radially outwardly towards the inner wall of said casing in response to sudden impacts on said rod for braking said rod against movement, wedging means for effecting said outward movement of the braking elements, and means for moving said braking elements radially inward to their normal position to permit free movement of the braking mechanism along the casing so that normal operation of the steering mechanism will not be impeded.

9. A stabilizer for the steering mechanism of a vehicle, said stabilizer adapted for connection at one end to a part of the vehicle relatively stationary with respect to the steering mechanism, and at the other end to the steering mechanism or to an element movable in response to movement of the steering wheel of the vehicle, said stabilizer comprising a casing, a member disposed within said casing and movable longitudinally of said casing, wedging means movable by said member, braking means disposed adjacent said wedging means and movable radially outwardly towards the inner wall of said casing in response to sudden impacts on said member, anti-friction elements interposed between said wedging means and braking means, and means for moving said braking means radially inward to their normal position to permit free movement of said braking means along said casing so that normal operation of the steering mechanism will not be impeded.

10. A stabilizer for the steering mechanism of a vehicle, said stabilizer adapted for connection at one end to a part of the vehicle relatively stationary with respect to the steering mechanism, and at the other end to the steering mechanism or to an element movable in response to movement of the steering wheel of the vehicle, said stabilizer comprising a casing, a rod reciprocable within said casing, and braking mechanism movable by said rod along said casing, said mechanism comprising braking elements movable outwardly towards the inner wall of said casing, and spring means opposing said outward movement.

11. A stabilizer for the steering mechanism of a vehicle, said stabilizer comprising a casing, a rod reciprocable in said casing and braking mechanism movable by said rod along said casing, said casing being adapted for connection to a part of the vehicle relatively stationary with respect to the steering mechanism and said rod being actuated in response to the movement of the steering wheel of the vehicle, said rod and braking mechanism being freely movable with respect to the casing during normal movement of the vehicle, and incompressible and unyielding means responsive to sudden impacts on the steering mechanism for instantaneously increasing the friction between said braking mechanism and said casing to a point wherein such members are temporarily immovable with respect to each other, whereby the operation of the steering wheel is momentarily prevented.

HENRY W. BOGART.